UNITED STATES PATENT OFFICE.

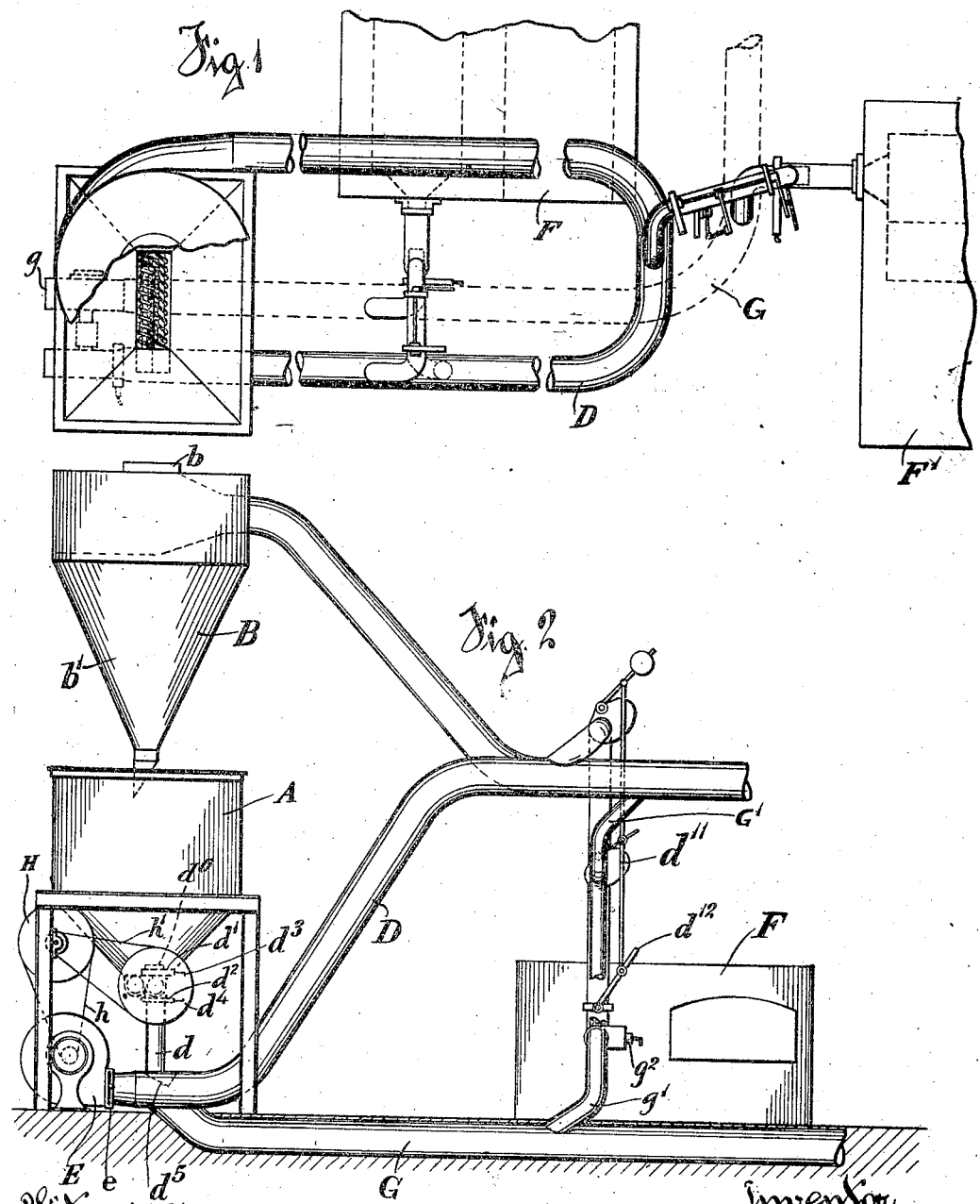

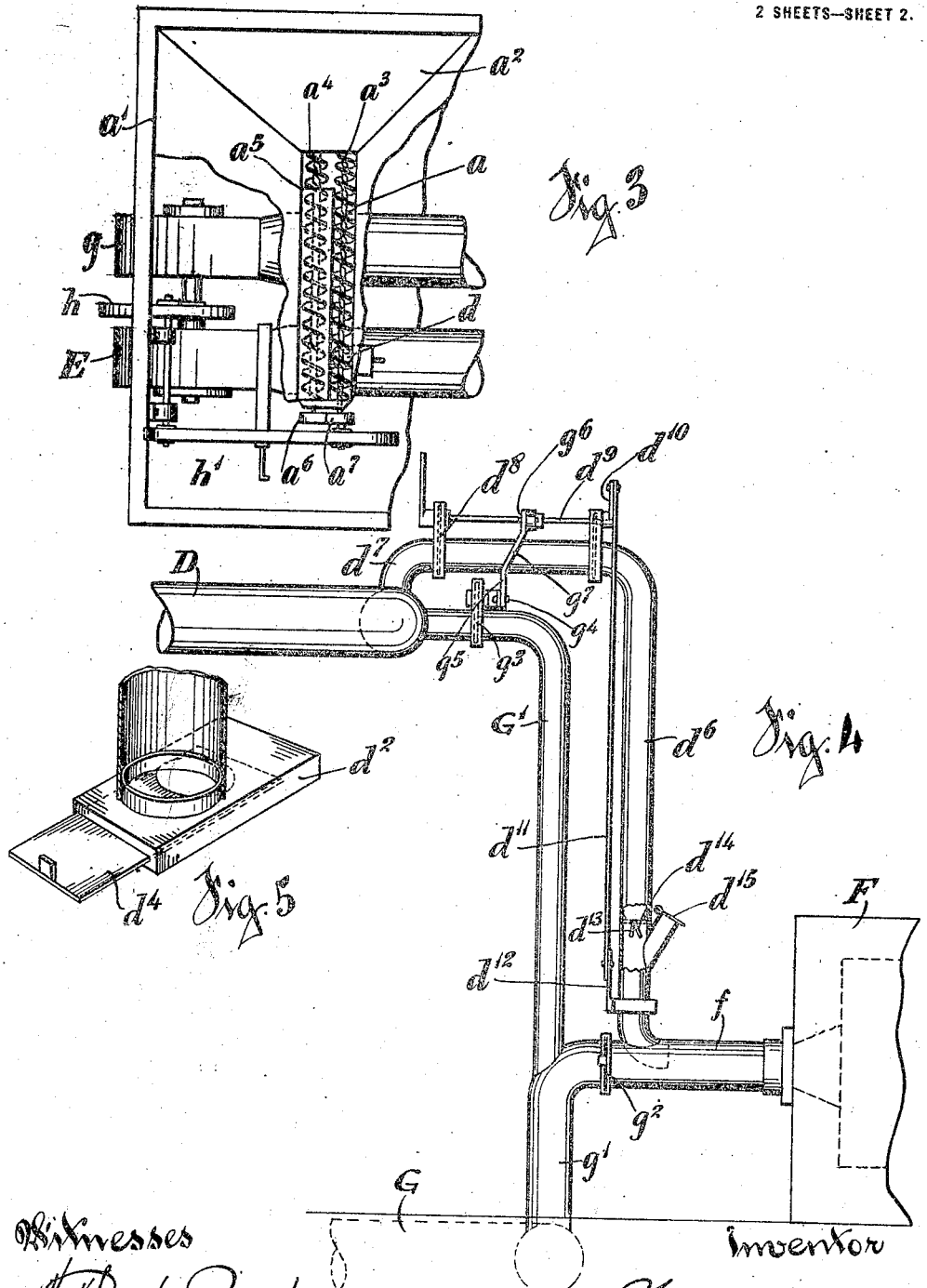

WALTER L. CAVEN, OF CINCINNATI, OHIO, ASSIGNOR OF ONE-HALF TO WALTER MACLEOD, OF CINCINNATI, OHIO.

POWDERED-FUEL FEEDER.

1,162,221.  Specification of Letters Patent.  Patented Nov. 30, 1915.

Application filed September 2, 1913. Serial No. 787,604.

*To all whom it may concern:*

Be it known that I, WALTER L. CAVEN, a citizen of the United States of America, and resident of Cincinnati, county of Hamilton, and State of Ohio, have invented certain new and useful Improvements in Powdered-Fuel Feeders, of which the following is a specification.

My invention relates to apparatus for feeding powdered coal and air to furnaces.

The object of my invention is a fuel feeder provided with an improved means for handling the surplus fuel which is drawn from the reservoir, and with an improved means for regulating the supply of fuel and air, so as to meet the varying demands of each furnace.

In the drawings, Figure 1 is a plan view of an apparatus embodying my invention, parts of the main fuel pipe being broken out and the ends being brought together to economize space. Fig. 2 is a side elevation thereof. Fig. 3 is a detail plan view of the hopper and the means for feeding fuel therefrom into the main pipe. Fig. 4 is a detail side elevation of the fuel pipe, the air pipe, and the branch pipes for connecting them with a furnace. Fig. 5 is a perspective view of one of the gate valves for regulating the passage of fuel from the hopper to the fuel pipe.

In the apparatus embodying my invention there is a fuel circuit, through which a constant circulation of powdered fuel and air is maintained; furnaces located at intervals along the fuel circuit; branch pipes leading from the fuel circuit to the furnaces, and means for regulating the divergence of fuel and air from the fuel circuit into the branch pipes and thence to the furnaces.

For the purpose of varying the mixture of fuel and air to meet the varying requirements of each furnace, I provide an air pipe, branch pipes leading thence to the furnaces, and means for regulating the amount of air drawn from the air pipe into the branch air pipes.

The fuel circuit contains a hopper A, for holding the powdered fuel, a dust collector B, for receiving the surplus fuel and separating it from its air, a fuel supply pipe D, which leads from a point adjacent to the hopper A back into the dust collector B. A vertical feed pipe $d$ connects the lower end of the hopper A with the fuel supply pipe D.

Hopper A has a rectangular bottom $a$, which is connected with the vertical sides $a'$ of the hopper, by means of tapering sides $a^2$. In the bottom $a$ of the hopper are two spiral conveyers $a^3$ $a^4$, the direction of rotation of which are reversed relatively to each other, so that the spiral $a^3$ will carry the fuel toward the feed pipe $d$, and the spiral $a^4$ will carry the fuel away from said feed pipe. Above spiral $a^4$ is a plate $a^5$, which covers the spiral $a^4$, with the exception of its discharge end. The shafts of the conveyers carry upon their ends intermeshing gear wheels $a^6$ $a^7$.

Feed pipe $d$ is provided with two gate valves $d'$ $d^2$, by means of slides $d^3$ $d^4$ of which the size of the passage through the feed pipe $d$ may be regulated. The slide $d^4$ is to regulate the amount of fuel passing through the feed pipe, and the slide $d^3$ performs the function of admitting air into the feed pipe $d$ through the open end $d^6$ of the feed pipe $d$, in order to break the suction that will be caused in the feed pipe by the air blown into the fuel pipe D from the fan. Adjacent to the feed pipe $d$, the fuel supply pipe is provided with a rotary fan E, which forces air through the pipe D, to be intermingled with the fuel emerging from the feed pipe $d$, the entrance of which into the fuel pipe D is guarded by a deflector $d^5$, which prevents air from the fan blowing up the feed pipe $d$. The discharge of the fan E is provided with a gate valve $e$, similar in construction to the gate valve $d^2$, for regulating the amount of air carried by the fan into the feed supply pipe D.

The feed pipe D is shown as being carried up above the level of the fan, the purpose thereof being to have the fuel pipe adjacent to the ceiling of the furnace room. Pipe D enters the dust collector B at a tangent, so that the air will be separated from the dust and escape through the opening $b$ in the upper part of the collector, while the dust falls through the funnel $b'$, back into the hopper A. The construction of this dust collector is well known and need not be more specifically described.

Any number of furnaces may be located adjacent to the fuel supply pipe. I have illustrated two furnaces F F'. An air pipe G is placed so that it runs adjacent to the furnaces. I have illustrated a fan $g$ for forcing air through an air pipe G, whose shaft is in mesh with the shaft of the fan E, so that the shafts of the fans E and $g$ may be rotated by one belt $h$, which passes over a driving pulley H, from the shaft of which a second belt $h'$ passes to a pulley mounted upon the shaft of the conveyer $a^3$.

The means for connecting the furnaces with the fuel pipe and with the air pipe are similar to each other, hence I will describe them in connection with the furnace F.

Nozzle $f$, leading into the furnace F, for conveying thereto a mixture of dust and air, is of well known construction and need not be specifically described. A fuel branch pipe $d^6$ connects nozzle $f$ with the fuel supply pipe D, the end $d^7$ thereof leaving the pipe D at an angle inclined in the direction of the flow of the fuel. Adjacent to the pipe D, branch $d^6$ is provided with a gate valve $d^8$, which is mounted upon a rotatable rod $d^9$, by the rotation of which the gate valve $d^8$ may be moved to open to a greater or less extent the branch $d^6$. Rod $d^9$ is provided with a crank $d^{10}$, an arm $d^{11}$ extending toward the floor of the room and provided at its lower end with a lever $d^{12}$, but is mounted upon the pipe $d^6$, adjacent to the nozzle $f$, in a convenient position for manipulation by an operator near the furnace F. Branch pipe $d^6$ is provided with a check valve for preventing back-flashing from the furnace into the feed pipe. This check valve consists of two semi-circular disks $d^{13}$ $d^{14}$, pivoted upon a horizontal rod, which is secured at its opposite ends diametrically across the interior of the pipe $d^6$. A relief valve $d^{15}$ is supplied upon the side of the pipe $d^6$, to relieve the pressure due to any back-flashing. A branch air pipe $g'$ leads from the air pipe G to the nozzle $f$. It is supplied with a gate valve $g^2$ of a construction similar to the gate valve $d^2$, by the positions of which the size of its opening into the nozzle is regulated.

To maintain the velocity of the fuel in the supply pipe, I introduce air into it at points following the points at which fuel is carried therefrom into the branch pipes, and I provide automatic means for regulating the amount of air thus admitted, to conform with the amount of fuel withdrawn, so as to maintain a uniform quantity of material in the fuel supply pipe. The means for thus maintaining the velocity in the fuel supply pipe, is an air branch pipe $G'$, leading from the air pipe G into the fuel supply pipe D, at a point immediately following the point at which branch pipe $d^6$ projects from the pipe D. The means for regulating the opening of the pipe $G'$ in proportion to the opening in the branch pipe $d^6$, is a gate valve $g^3$, which is mounted upon a rotating rod $g^4$, which is connected by levers $g^5$ $g^6$ and arm $g^7$ to the rotating arm $d^9$, so that the arm $g^4$ will rotate in unison with the arm $d^9$, and thus rotate the valve $g^3$ in proportion to the rotation of the valve $d^8$, and thereby regulate the opening of the pipe $G'$ in proportion to the opening of the pipe $d^6$.

In operation: The gate valves $d'$ $d^2$ having been adjusted to permit the desired amount of powdered fuel to descend from the hopper into the feed pipe D, and the gate valve $e$ having been adjusted, so as to permit the desired amount of air to be drawn from the fan E into the feed pipe D, a mixture of air and pulverized fuel in the proportions desired, will be carried through the feed pipe and thence into the dust collector B, at which point the air will separate from the fuel and be discharged through the exit $b$, and the fuel will fall through the funnel $b'$ back into the hopper. The spiral conveyer $a^3$ will continuously feed the fuel toward the opening in the feed pipe D; surplus from there will be carried back by the conveyer $a^4$, so as to keep the fuel in the hopper evenly distributed. Thus a constant passage of fuel and air will be maintained through the fuel circuit. The valve $d^8$ of end branch pipe $d^6$ being open, an amount of fuel and air, proportionate to the amount of the opening, will be carried from the fuel supply pipe to the furnaces. The opening of the valve $d^8$ in a branch pipe simultaneously opens a valve $g^3$ in the air branch pipe $G'$, so as to carry into the fuel supply pipe an amount of air equal in volume to the air and fuel withdrawn therefrom through the branch pipe $d^6$. Should it be desired to vary the proportions of air and coal dust for any furnace, this may be done by admitting air from the air pipe G into the nozzle $f$, to be intermingled with the mixture drawn from the fuel supply pipe D. The amount of air thus being drawn from the air pipe G, is regulated by means of the gate valve $g^2$. By this means each fuel supply for a furnace is made a unit elastic to the needs of that furnace. Should the branch pipe leading to a furnace and the branch pipe leading to any number of furnaces be closed, the surplus fuel thus left in the main supply pipe is carried around therein and deposited again into the dust collector, and is carried thence into the hopper.

What I claim is:

1. In a powdered fuel feeder, the combination of a hopper, a dust collector discharging into the hopper, a fuel pipe leading from the hopper into the collector, a series of furnaces adjacent to the fuel pipe, an air pipe adjacent to the furnaces, means for forcing air through the air pipe, nozzles leading into the furnaces, branch fuel pipes connecting the fuel pipe and the nozzles, branch air pipes connecting the air pipe and the nozzles, and valves in the branch fuel pipes and branch air pipes.

2. In a powdered fuel feeder, the combination of a hopper, a dust collector discharging into the hopper, a fuel pipe leading from the hopper into the collector, a series of furnaces adjacent to the fuel pipe, an air pipe adjacent to the furnaces, means for forcing air through the air pipe, nozzles leading into the furnaces, branch fuel pipes connecting the fuel pipe and the nozzles, branch air pipes connecting the air pipe and the nozzles, second branch air pipes leading from the air pipe into the fuel pipe beyond the branch fuel pipes, and valves in the branch fuel pipes and branch air pipes.

3. A powdered fuel feeder having a fuel circuit, means for feeding a mixture of fuel dust and air through the circuit, furnaces adjacent to the circuit, branch fuel pipes leading from the fuel circuit into the furnaces, valves for regulating the opening of the branch fuel pipes, an air pipe, branch air pipes connecting the air pipe and the fuel pipe at points beyond the branch fuel pipes, valves in the branch pipes, and means for connecting the valves in the branch air pipes and the branch fuel pipes, whereby the valves are moved simultaneously.

In testimony whereof, I have hereunto subscribed my name this 21st day of August, 1913.

WALTER L. CAVEN.

Witnesses:
WALTER F. MURRAY,
W. THORNTON BOGERT.